Aug. 12, 1924.

C. C. LAURITSEN 1,505,050

WEIR METER

Filed Feb. 19, 1920

Inventor,
Charles C. Lauritsen
By Hull, Smith, Brock & West
Attys.

Patented Aug. 12, 1924.

1,505,050

UNITED STATES PATENT OFFICE.

CHARLES C. LAURITSEN, OF CLEVELAND, OHIO, ASSIGNOR TO THE OHIO BODY AND BLOWER COMPANY, OF CLEVELAND, OHIO, A CORPORATION OF OHIO.

WEIR METER.

Application filed February 19, 1920. Serial No. 359,933.

*To all whom it may concern:*

Be it known that I, CHARLES C. LAURITSEN, a subject of the King of Denmark, residing at Cleveland, in the county of Cuyahoga and State of Ohio, have invented a certain new and useful Improvement in Weir Meters, of which the following is a full, clear, and exact description, reference being had to the accompanying drawings.

This invention relates to a weir for the measurement of a liquid when the same is allowed to pass freely thereover.

Some of the objects of the present invention are to provide a weir notch of such shape that the quantity of liquid flowing therethrough at any given instant shall be directly proportional to the square of the height of such liquid; to provide a notch whose shape is such that the degree of accuracy of the aforesaid relation shall hold true between minimum and maximum liquid levels; to provide a notch which shall discharge a quantity of liquid therethrough, in such relation to the height of said liquid as will readily permit direct recording upon a circular area; while further objects and advantages will appear as the description proceeds.

Figure 1:
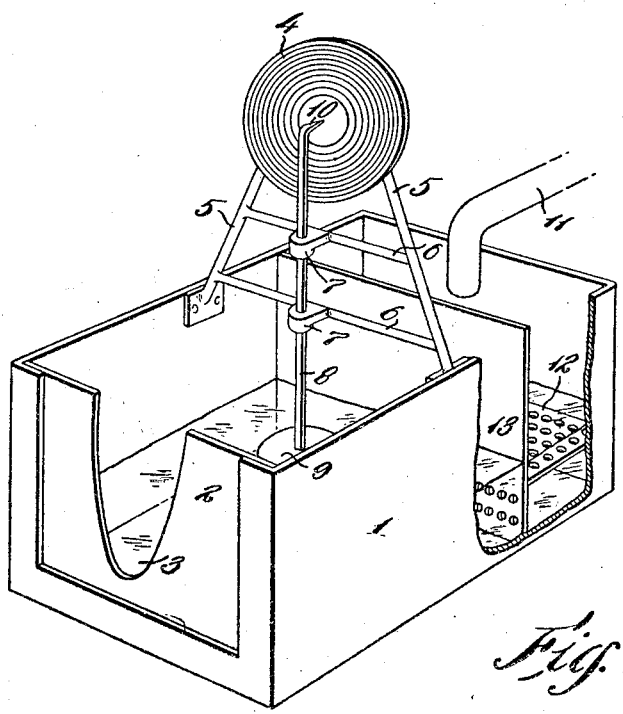
Figure 2:
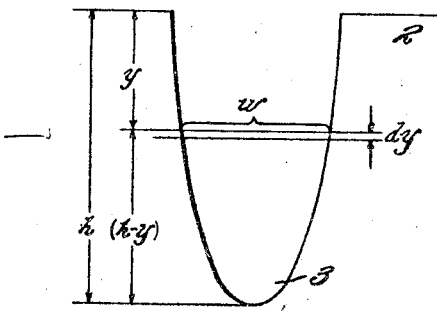

In the accompanying drawings, Fig. 1 illustrates a simple form of apparatus to which my notch has been applied and Fig. 2 is a diagrammatic illustration of the theory of the shape of my notch.

Describing the various parts by reference numerals 1 indicates a suitable container having positioned in one end thereof, in any approved manner, a weir plate 2 which is provided with the notch 3. A circular dial or chart 4, adapted to be rotated by a clockwork (not shown) is supported above the container by the arms 5—5 which are braced by the transverse members 6—6, each of which is provided with a suitable guide 7 for the float stem 8. A float member 9 is fastened to the lower end of the stem while the upper end is provided with a stylus 10 which rises and falls vertically with the water level. The length of the stem 8 is preferably such that the stylus will be at the center or zero point of the chart 4 when the liquid in the container is level with the bottom of the notch 3 as shown in Fig. 1.

The liquid to be measured is admitted to the container in any approved manner so as to cause no disturbance to the float 9 by currents, and as an example of such I have shown a supply pipe 11 discharging the liquid onto a horizontal perforated baffle plate 12 which is positioned between the rear wall of the container and the vertical baffle plate 13, the lower end of which is perforated to admit the liquid to the container proper.

In order to fully illustrate the mathematical principle underlying a weir notch of such shape that the quantity of liquid passing therethrough in any given instant shall be directly proportioned to the square of the height of such liquid, reference may be had to Fig. 2 wherein $dy$ represents any elementary lamina having a width $w$ and a head $y$. The total height of the notch is represented by the distance $h$.

Then the theoretical discharge $dQ$ is equal to the area times the velocity due to the head on the center of gravity of the lamina selected which may be represented by the equation $$dQ_t = w\,dy\,\sqrt{2gy} \quad (1)$$

The notch is question, however, is a parabola, the equation of which, represented in rectangular coordinates, the origin being at the vertex of its axis, is $x^2 = 2py$. Substituting the values in Fig. 2 in this equation we have $$\left(\frac{w}{2}\right)^2 = 2p(h-y)$$

or $$w = 2\sqrt{2p(h-y)}$$

substituting this value of $w$ in the equation (1) we have $$dQ_t = 2\sqrt{2p(h-y)}\,dy\,\sqrt{2gy}$$

Then for the total discharge we have $$Q_t = 2\sqrt{2g}\sqrt{2p}\int_0^h \sqrt{y(h-y)}\,dy. \quad (2)$$

Taking Z as the geometric means between $y$ and $(h-y)$ we have $Z^2=y(h-y)$. Substituting in equation (2) we then have $$Q_t = 2\sqrt{2g}\sqrt{2p}\int_0^h \sqrt{Z^2}dy$$

or $$Q_t = 2\sqrt{2g}\sqrt{2p}\int_0^h Z\,dy$$

But $\int Z\,dy$ is the area of a semi-circle over $h$ as a diameter and equation (3) becomes $$Q_t = 2\sqrt{2g}\sqrt{2p}\frac{\pi}{8}h^2$$

or $$Q_t = \sqrt{2g}\sqrt{2p}h^2\frac{\pi}{4}$$

in which $\frac{\pi}{4}$, $2g$ and $2p$ are constants hence this equation may be represented as $Q_t=Kh^2$.

It thus becomes apparent that the quantity of liquid flowing through the weir at any given instant is directly proportional to the square of the height of such liquid.

If desired the notch may be of such size that the constant K is equal to 1, in which case the quantity of liquid flowing therethrough at any given instant is equal to the square of the height of the liquid.

Because of this relation between the quantity and height of the liquid my notch adapts itself to recording directly on a circular area since the area of a circle is directly proportional to the square of its radius and hence the area enclosed on the circular dial or chart will be directly proportional to the quantity of liquid flowing through the notch.

Obviously if the radius of the chart and the height of the notch are equal, the quantity of liquid flowing therethrough will be equal to the area enclosed by the stylus, times a constant depending on the units of measurement and velocity of the chart.

Having thus described my invention, what I claim is:—

1. A liquid meter provided with a weir notch having a minimum and maximum liquid level, the shape of said notch being such that the quantity of liquid flowing therethrough will at all levels be directly proportional to the square of the height of said liquid above the minimum level.

2. A liquid meter provided with a weir notch having an edge formed on a constantly changing curvature and symmetrical with respect to the vertical axis thereof, the shape of said notch being such that the quantity of the liquid flowing therethrough will at all levels be directly proportional to the square of the height of said liquid above the minimum level.

3. A liquid meter provided with a weir notch having a minimum and maximum liquid level, the shape of said notch being such that the quantity of liquid flowing therethrough bears a relation to the height of said liquid such as to permit recording on a revolving circular area, the enclosed area being in direct proportion to the quantity of liquid flowing through said notch.

4. A liquid meter provided with a weir notch having the shape of a parabola whose axis is substantially vertical.

5. A liquid meter comprising a container having an outlet in the form of a weir notch of such shape that the quantity of liquid flowing therethrough varies as the square of the height of the liquid in said notch, a member responsive to the variation in height of liquid in said notch, a rotary chart, and means connecting said member with said chart to record the quantity of liquid passing through said notch.

6. A liquid meter comprising a container having an outlet in the form of a weir notch of such shape that the quantity of liquid flowing therethrough varies as the square of the height of the liquid in said notch, a float responsive to the variation in height of liquid in said notch, a chart adapted to be rotated at a constant speed, a stylus adapted to mark on said chart, and means connecting said float and stylus to move said stylus with respect to said chart in accordance with the movement of said float.

7. A liquid meter comprising a container having an outlet in the form of a parabolic weir notch, a member responsive to the variation in the height of liquid flowing through said notch, and recording means operatively connected with said member and adapted to record the quantity of liquid flowing through said notch.

8. A liquid meter comprising a container having an outlet in the form of a parabolic weir notch, a float movable in accordance with the rise and fall of liquid in said notch, a chart adapted to be rotated at a constant speed, a stylus adapted to mark on said chart, and a connection between said stylus and float for moving said stylus in accordance with said float.

In testimony whereof, I hereunto affix my signature.

CHARLES C. LAURITSEN.